United States Patent
McElroy et al.

(10) Patent No.: US 8,502,506 B2
(45) Date of Patent: Aug. 6, 2013

(54) PORTABLE ELECTRICAL POWER SOURCE FOR INCORPORATION WITH AN ARMORED GARMENT

(75) Inventors: Michael McElroy, Gilbert, AZ (US); Valent Horvatich, Scottsdale, AZ (US); Joseph Wesley Coltman, III, Scottsdale, AZ (US); Daniel Furth, Mesa, AZ (US); Kenneth Sego, Jr., Phoenix, AZ (US); Kenneth Lee Von Der Ahe, Gilbert, AZ (US); Eric Hoenes, Austin, TX (US)

(73) Assignee: BAE Systems Aerospace & Defense Group Inc., Phoenix, AZ (US)

( * ) Notice: Subject to any disclaimer, the term of this patent is extended or adjusted under 35 U.S.C. 154(b) by 751 days.

(21) Appl. No.: 12/688,770

(22) Filed: Jan. 15, 2010

(65) Prior Publication Data

US 2011/0173731 A1    Jul. 21, 2011

(51) Int. Cl.
*H02J 7/00* (2006.01)
*H02J 7/04* (2006.01)
*F41H 1/02* (2006.01)

(52) U.S. Cl.
USPC ........... 320/136; 320/132; 320/134; 320/152; 2/2.5

(58) Field of Classification Search
USPC ............. 320/127, 128, 132, 134, 150, 152, 320/136; 2/2.5, 455, 456, 463, 464, 905; 219/211
See application file for complete search history.

(56) References Cited

U.S. PATENT DOCUMENTS

| | | | |
|---|---|---|---|
| 3,331,083 A | 7/1967 | Holly | |
| 3,452,362 A | 7/1969 | Korolick et al. | |
| 3,557,384 A | 1/1971 | Barron et al. | |
| 3,559,210 A | 2/1971 | Hansen | |
| 3,793,648 A | 2/1974 | Dorre et al. | 2/2.5 |
| 3,832,266 A | 8/1974 | Archibald | 161/93 |
| 3,858,241 A | 1/1975 | Durand et al. | 2/2.5 |
| 3,873,998 A | 4/1975 | Norris et al. | 2/2.5 |
| 4,292,882 A | 10/1981 | Clausen | 89/36 A |
| 4,352,316 A | 10/1982 | Medlin | 89/36.02 |
| 4,530,111 A | 7/1985 | Barron et al. | 2/2.5 |
| 4,613,535 A | 9/1986 | Harpell et al. | 428/113 |
| 4,633,756 A | 1/1987 | Rudoi | 89/36.02 |
| 4,857,119 A | 8/1989 | Karst et al. | 148/219 |
| 4,879,165 A | 11/1989 | Smith | 428/212 |
| 4,923,728 A | 5/1990 | Snedeker | 428/52 |
| 4,987,033 A | 1/1991 | Abkowitz et al. | 428/469 |
| 5,007,326 A | 4/1991 | Gooch, Jr. et al. | 89/36.02 |
| 5,060,314 A | 10/1991 | Lewis | 2/2.5 |
| 5,185,195 A | 2/1993 | Harpell et al. | 428/102 |
| 5,196,252 A | 3/1993 | Harpell | 428/102 |
| 5,221,807 A | 6/1993 | Vives | 89/36.02 |
| 5,312,675 A | 5/1994 | Cooper et al. | 428/215 |
| 5,340,633 A | 8/1994 | Van der Loo et al. | 428/114 |
| 5,349,893 A | 9/1994 | Dunn | 89/36.05 |
| 5,362,527 A | 11/1994 | Harpell et al. | 428/33 |

(Continued)

*Primary Examiner* — Richard V Muralidar
(74) *Attorney, Agent, or Firm* — Pillsbury Winthrop Shaw Pittman LLP

(57) ABSTRACT

An apparatus may be configured to provide electrical power while incorporated in an armored garment. The apparatus may include a plate having a footprint that corresponds to a plate of body armor, a plurality of energy storage cells carried by the power plate, and a port carried by the plate. The port may be configured to output power stored in the plurality of energy storage cells from the apparatus. The apparatus may also include one or more processors configured to enhance functionalities of the apparatus.

12 Claims, 10 Drawing Sheets

U.S. PATENT DOCUMENTS

| | | | | |
|---|---|---|---|---|
| 5,443,917 | A | 8/1995 | Tarry | 428/545 |
| 5,465,424 | A | 11/1995 | Cudney et al. | 2/462 |
| 5,500,952 | A | 3/1996 | Keyes | 2/465 |
| 5,515,541 | A | 5/1996 | Sacks et al. | 2/2.5 |
| 5,635,288 | A | 6/1997 | Park | 428/105 |
| 5,771,489 | A | 6/1998 | Snedeker | 2/12.5 |
| 5,824,940 | A | 10/1998 | Chediak et al. | 89/36.05 |
| 5,831,198 | A | 11/1998 | Turley et al. | 89/1.11 |
| 5,906,873 | A | 5/1999 | Kim | 428/57 |
| 5,935,678 | A | 8/1999 | Park | 428/105 |
| 5,960,470 | A | 10/1999 | Bachner, Jr. | 2/2.5 |
| 5,970,843 | A | 10/1999 | Strasser et al. | 89/36.02 |
| 6,000,055 | A | 12/1999 | Citterio | 2/2.5 |
| 6,009,789 | A | 1/2000 | Lyons | 89/36.02 |
| 6,026,510 | A | 2/2000 | Kocher | 2/2.5 |
| 6,029,269 | A | 2/2000 | El-Soudani | 2/2.5 |
| 6,035,438 | A | 3/2000 | Neal et al. | 2/2.5 |
| 6,131,193 | A | 10/2000 | Bachner, Jr. | 2/2.5 |
| 6,135,006 | A | 10/2000 | Strasser et al. | 89/36.05 |
| 6,138,275 | A | 10/2000 | Sacks | 2/2.5 |
| 6,154,880 | A | 12/2000 | Bachner, Jr. | 2/2.5 |
| 6,219,842 | B1 | 4/2001 | Bachner, Jr. | 2/2.5 |
| 6,314,858 | B1 | 11/2001 | Strasser et al. | 89/36.02 |
| 6,332,390 | B1 | 12/2001 | Lyons | 89/36.02 |
| 6,389,594 | B1 | 5/2002 | Yavin | 2/2.5 |
| 6,408,733 | B1 | 6/2002 | Perciballi | 89/36.02 |
| 6,500,507 | B1 | 12/2002 | Fisher | 428/36.1 |
| 6,510,777 | B2 | 1/2003 | Neal | 89/36.02 |
| 6,544,913 | B2 | 4/2003 | Kim et al. | 501/32 |
| 6,718,861 | B1 | 4/2004 | Anderson, Jr. et al. | 89/36.02 |
| 6,807,891 | B2 | 10/2004 | Fisher | 89/36.02 |
| 6,841,492 | B2 | 1/2005 | Bhatnagar et al. | 442/135 |
| 6,846,758 | B2 | 1/2005 | Bhatnagar et al. | 442/135 |
| 7,067,031 | B2 | 6/2006 | deWitt | 156/250 |
| 7,146,899 | B2 | 12/2006 | Imblum et al. | 89/36.01 |
| 7,222,562 | B2 | 5/2007 | Smiley | 89/36.08 |
| 7,404,352 | B1 | 7/2008 | Hoffman | 89/36.03 |
| 7,407,900 | B2 | 8/2008 | Cunningham | 442/135 |
| 7,540,228 | B1 | 6/2009 | Cronin et al. | 89/36.02 |
| 7,805,767 | B2 | 10/2010 | McElroy et al. | 2/2.5 |
| 8,397,312 | B1 * | 3/2013 | Crye et al. | 2/2.5 |
| 2002/0033744 | A1 | 3/2002 | Sengupta et al. | 333/157 |
| 2002/0034667 | A1 | 3/2002 | Sengupta | 428/702 |
| 2002/0093401 | A1 | 7/2002 | Chiu et al. | 333/231 |
| 2002/0093402 | A1 | 7/2002 | Sengupta et al. | 333/238 |
| 2002/0097117 | A1 | 7/2002 | Chiu et al. | 333/238 |
| 2002/0101309 | A1 | 8/2002 | Chiu et al. | 333/243 |
| 2002/0126048 | A1 | 9/2002 | Zhu et al. | 343/700 |
| 2003/0119656 | A1 | 6/2003 | Chiu et al. | 501/138 |
| 2006/0252325 | A1 | 11/2006 | Matsumura et al. | 442/123 |
| 2007/0010151 | A1 | 1/2007 | Cunningham | 442/135 |
| 2007/0245441 | A1 | 10/2007 | Hunter | 2/2.5 |
| 2007/0283477 | A1 | 12/2007 | Dovner | 2/2.5 |
| 2008/0155737 | A1 | 7/2008 | Marchesi | 2/456 |
| 2008/0307553 | A1 | 12/2008 | Jbeili et al. | 2/2.5 |
| 2012/0198593 | A1 * | 8/2012 | Beck et al. | 2/2.5 |
| 2013/0042376 | A1 * | 2/2013 | Hexels | 2/2.5 |

* cited by examiner

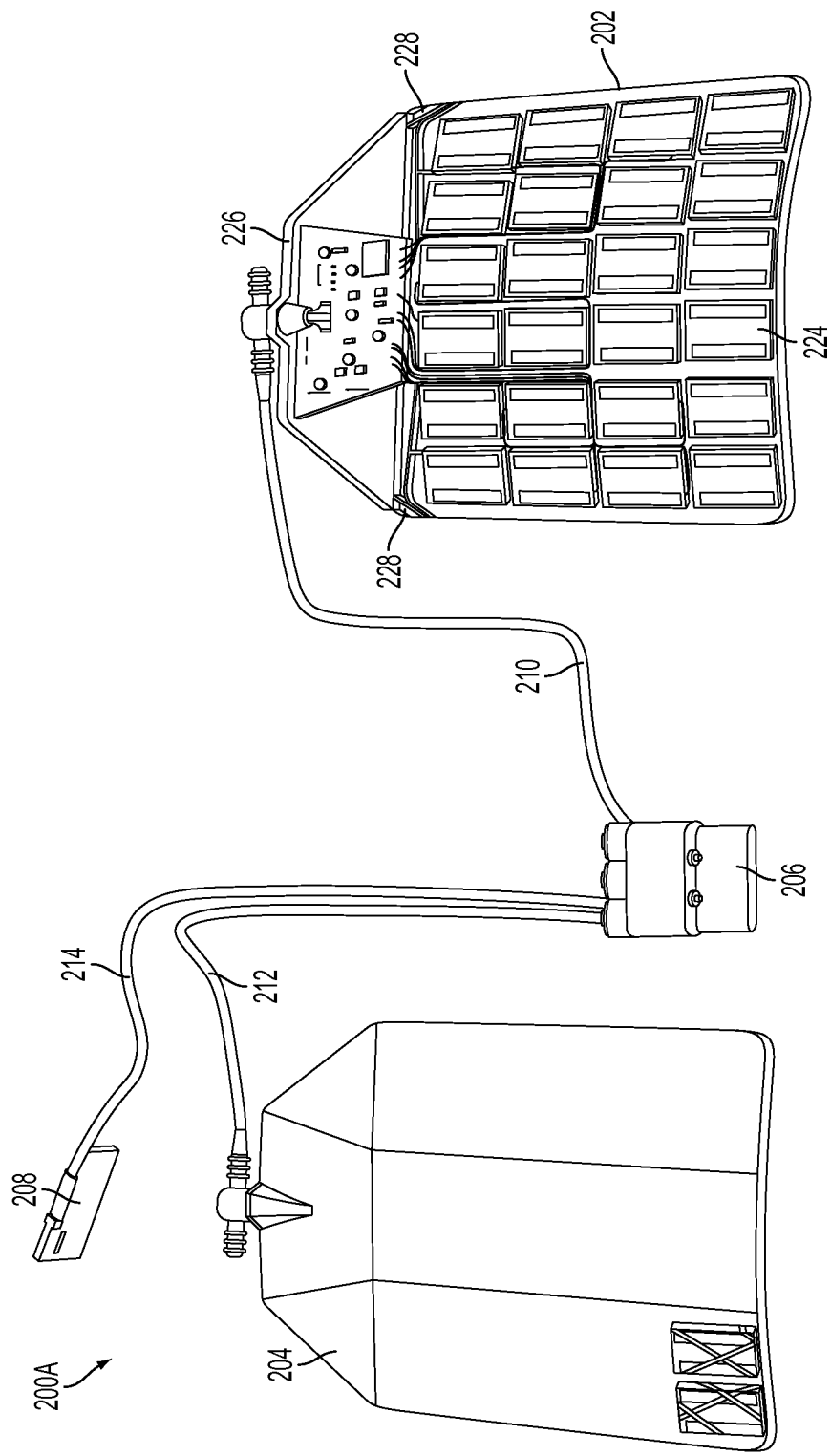

PORTABLE ELECTRICAL POWER SOURCE FOR INCORPORATION WITH AN ARMORED GARMENT

FIELD OF THE INVENTION

The invention relates to a portable electrical power source that can be incorporated with an armored garment.

BACKGROUND OF THE INVENTION

Military and law enforcement personnel often wear armored garments such as bullet-resistant vests while on duty. The use of devices that require electrical power in order to operate is becoming more and more common among military and law enforcement personnel. Some armored garments incorporate power supplies to provide electrical power to such devices. These power supplies, however, lack functionality beyond common batteries.

SUMMARY

One aspect of the invention relates to a portable power system assembly. The portable power system assembly may include a power plate, a hub, a display, and peripheral devices. The power plate serves as a power source and provides electrical power to the peripheral devices via the hub. Cables such as cables may couple the power plate, the hub, the display, and the peripheral devices. Any device (e.g., the power plate, display, and/or the peripheral devices) may be connected to the hub without identifying or "keying-in" that device. The display may be any device suitable for visually conveying dynamic information to a user of the portable power system assembly. The peripheral devices can include any device that uses electrical power to operate, such as a GPS device, a radio, a battery charger, and/or an MP3 player.

The power plate may be incorporated in an armored garment. Such an armored garment may include any wearable item that is protective against ballistic projectiles like bullets, shrapnel, and/or other projectiles. Examples of armored garments may include bullet-resistant vests, armored headwear, lower body armor, and so forth. The power plate may be removable or permanently integrated with the armored garment. The power plate may be rigid, semi-rigid, partially flexible, or wholly flexible. The power plate may have a footprint that corresponds to the footprint of an armored plate. The armored plate may also be incorporated in an armored garment.

The power plate and the armored plate may be positioned proximally and face-to-face when incorporated in an armored garment. By way of non-limiting example, the power plate and the armored plate may be positioned at the anterior abdominal area of a vest such that, when worn by a user, the armored plate is disposed between the power plate and the user. Furthermore, a second power plate similar to the power plate and a second armored plate similar to the armored plate may be positioned to posterior abdominal area of the vest such that, when worn by the user, the second armored plate is disposed between the second power plate and the user. According to exemplary implementations, the power plate and constituent components thereof may be military ruggedized for field use, and may be designed to avoid vibrational susceptibility.

The armored plate may provide ballistic protection to a user of an armored garment that incorporates the armored plate. When positioned proximally and face-to-face, the power plate may enhance the protectiveness of the armored plate. For example, a ballistic projectile that first strikes the power plate may be decelerated, shattered, or deflected to some degree (e.g., twist), thereby reducing energy transmitted to the armored plate.

The power plate may include one or more cells such as cells. It should be appreciated that the power plate can include any number of cells. The cells may each include an electrochemical cell for electricity storage. It is noteworthy that the cells may be replaced by other types of electrical storage devices such as capacitive storage devices.

Furthermore, individual ones of the cells may include one or more sensors such as a temperature sensor. Examples of temperature sensors include thermocouples, thermistors, silicon bandgap temperature sensors, resistive thermal devices (RTDs), and so forth. The temperature sensor may be communicatively coupled with a processor, which is described further herein.

The cells may be electrically coupled in any number of configurations. A number of cells may be connected to form a string. The power plate may include a number of strings. The strings may each include or be associated with one or more overcurrent protection devices. Such overcurrent protection devices may be configured to limit current delivered to one of the strings.

The strings may include any configuration such as a linear array of cells or a rectangular array of cells. The cells that are respectively included in each of the strings may be connected in series, in parallel, or in another configuration. The strings may be connected in series, in parallel, or in another configuration. Additionally, the strings may be isolated from each other so that they are not interconnected. By segregating the strings, performance of the power plate may be maintained, even when one or more of the strings become disabled, such as in the event of ballistic impact on one of the strings. Furthermore, wires and/or cables routed to the cells may be segregated so as to minimize wire and/or cable failure in the event of ballistic impact on a wire or cable.

It is noteworthy that the spatial distribution of cells in the power plate may affect a thermal image of the power plate while in use. For example, if the cells are densely packed, a "hot spot" may be present in a thermal image. In contrast, if the cells are sparsely packed, any potential hot spot may be reduced.

The power plate may additionally include one or more processors such as processor. The processor is configured to provide information processing capabilities in the power plate. The natural frequency of the processor does not have a natural frequency below 2000 Hz when mounted to the power plate.

The processor may be configured to execute one or more computer program modules. The one or more computer program modules may include one or more of a temperature module, a charge level module, a status module, a cell disconnect module, a charge balancing module, a discharge balancing module, a status display module, and/or other modules.

The temperature module may be configured to monitor a temperature of one or more of the cells. This monitoring may be performed in conjunction with one or more temperature sensors such as the temperature sensor. According to some implementations, the temperature of each of the cells (or a subset thereof) may be individually monitored. Alternatively, the temperatures of the cells may be monitored as an aggregate temperature on a group basis. For example, the average temperature of cells in one string may be monitored as an aggregate temperature associated with that string.

The charge level module may be configured to determine a charge level of one or more of the cells. Charge level of a cell, for example, describes the amount of electrical power contained in or stored by that cell. The charge level of each of the cells (or a subset thereof) may be individually determined, in accordance with some implementations. The charge levels of the cells may also be determined as an aggregate charge level on a group basis. To illustrate, the aggregate charge level of each of the strings may be determined.

The status module may be configured to provide status information associated with one or more of the cells. Status information may be any information associated with one or more of the cells. For example, the status information may be based at least in part on the temperature and/or the charge level of one or more of the cells. The status module may also be executed to determine a fault associated with at least one of the cells. Such a fault may be based on any failure mode or other state of inoperability of one or more of the cells. Additionally, a fault may be based at least in part, for example, on the temperature and/or the charge level being outside of a predetermined range. The status information may be provided to other components of the portable power system assembly such as the hub, the display, and the peripheral devices via the cables.

The cell disconnect module may be configured to disconnect one or more of the cells having a fault associated therewith, such as that determined through execution of the status module. By disconnecting a cell having a fault, performance of the portable power system assembly may be maintained. For example, catastrophic failure of a cell such as an explosion or cell ignition may be prevented. Furthermore, leakage of damaged cells may be halted or minimized. Additionally, by disconnecting a cell having a fault, the remaining cells may be prevented from becoming faulty or otherwise damaged.

The charge balancing module may be configured to control a charge power level delivered to each of the cells, such as while the cells are being charged. Alternatively or additionally, the charge balancing module may be configured to control a charge power level delivered to at least one group of the cells. Generally, the charge balancing module may balance the charge power levels delivered to the cells by evenly charging the cells to maintain even capacities and temperatures among the cells (e.g., within threshold bands). To control the charge power level, voltage and/or current may be regulated. The charge power level may be controlled based on a number of factors such as cell capacity, cell resistance, cell temperature, and/or any other factors.

Controlling the charge power level during charging of the cells may extend lifetime and maintain proper performance of the cells, as well as prevent overheating. Controlling charge power level of each cell may minimize or greatly reduce charging times. For example, controlling the charge power level may prevent against overcharging where a cell's capacity is exceeded, overvoltage where the cell voltage exceeds an upper design limit, and/or overcurrent where the current delivered to the cell exceeds an upper design limit. To illustrate controlling a charge power level, if one cell is at 80% capacity and the remaining cells are each at 98% capacity, the charge balancing module will prevent excessive current from being provided to the one cell during charging while the capacity of the one cell is brought up to match that of the remaining cells.

The discharge balancing module may be configured to control a discharge power level drawn from each of the cells, such as when electrical power is being provided to the peripheral devices. Alternatively or additionally, the discharge balancing module may be configured to control a discharge power level drawn from at least one group of the cells. Generally, the discharge balancing module may balance the discharge power levels drawn from the cells by evenly discharging the cells to maintain even capacities and temperatures among the cells. To control the discharge power level, voltage and/or current may be regulated. The discharge power level may be controlled based on a number of factors such as cell capacity, cell resistance, cell temperature, and/or any other factors.

Controlling the discharge power level during discharging of the cells may extend lifetime and maintain proper performance of the cells, as well as prevent safety risks. For example, controlling the discharge power level may prevent against deep discharging where a cell is completely drained or rapid discharges due to shorted circuitry. To illustrate controlling a discharge power level, if the power plate is utilized to provide electrical power to a lamp that is left on for an extended period of time, the discharge balancing module may prevent the cells from becoming completely drained.

The status display module may be configured to provide status information to a user of the portable power system assembly, such as via the display. Status information may be provided to the status display module through execution of the status module. Status information may include information such as individual cell capacities, aggregate cell capacities, total cell capacity, individual cell temperatures, aggregate cell temperatures, and/or any other information associated with the cells. Faults associated with one or more of the cells may also be conveyed to a user though execution of the status display module. Additional data may be provided to a user through execution of the status display module, such as via the display. For example, the number of and identity of the peripheral devices connected to the may be indicated on the display.

Another aspect of the invention relates to an armored garment that incorporates an electrical power source. The armored garment may include an armor plate situated in the garment to provide ballistic protection to the front of the upper abdomen of a wearer of the garment. The armored garment may further include a sleeve disposed on the garment outside of the armor plate. The sleeve may be configured to secure an electrical power source to the garment having a footprint that corresponds to a footprint of the armor plate. The sleeve may have an opening through which the electrical power source is insertable and removable to the sleeve. The opening may be formed on a side of the sleeve opposite the head of a wearer of the garment while the garment is being worn by the user. The armored garment may further include a pouch configured to at least partially enclose the electrical power source within the sleeve. The electrical power source may enhance ballistic protection of the armored garment.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2A illustrates an exemplary implementation of a portable power system assembly.

DETAILED DESCRIPTION

Figure 1:
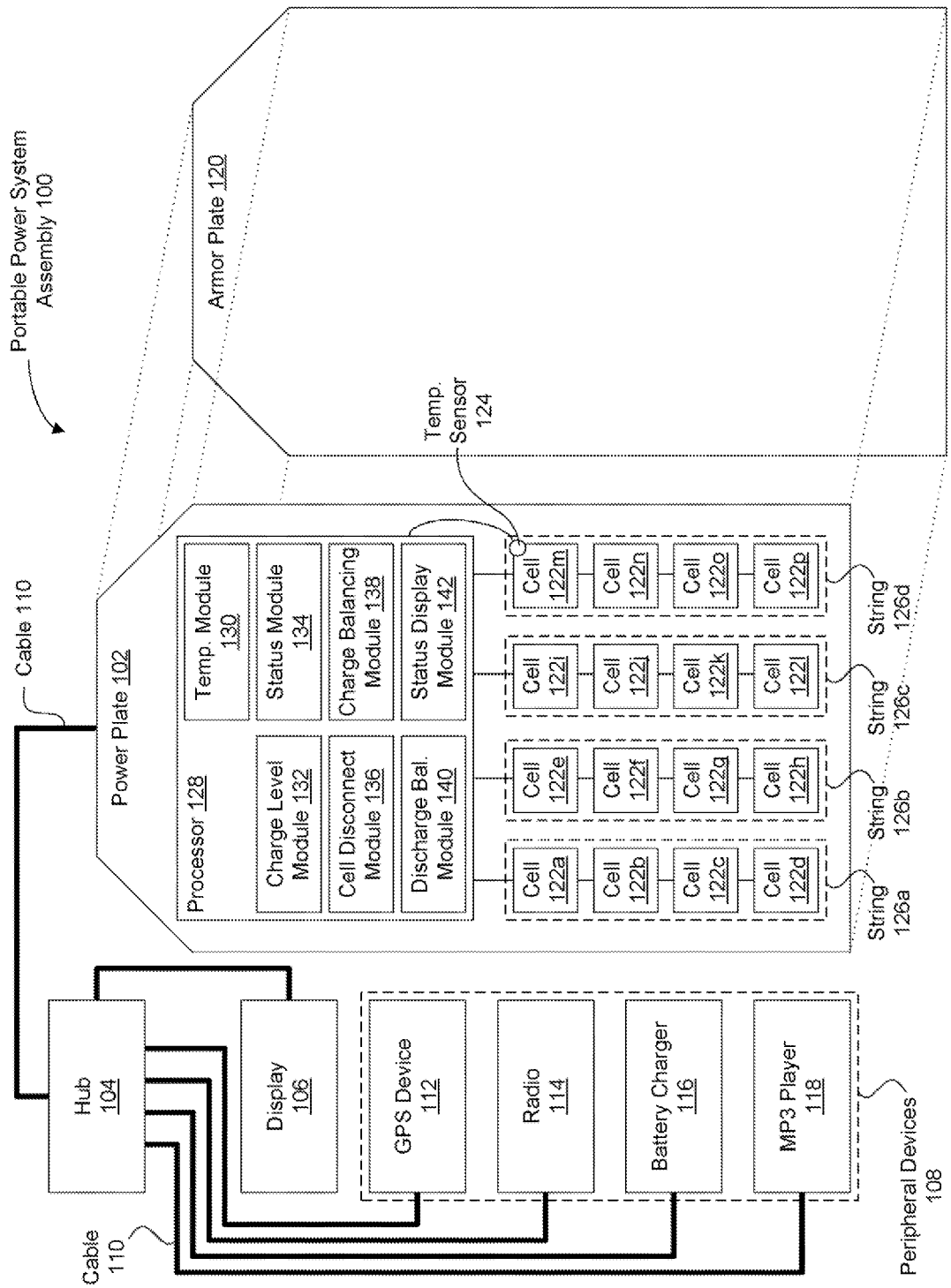
FIG. 1 illustrates a block diagram of an exemplary implementation of a portable power system assembly including a power plate that can be incorporated with an armored garment.

FIG. 1 illustrates a block diagram of an exemplary implementation of a portable power system assembly 100. The portable power system assembly 100 may include a power plate 102, a hub 104, a display 106, and peripheral devices 108. The power plate 102 serves as a power source and provides electrical power to the peripheral devices 108 via the hub 104. Cables such as cables 110 may couple the power plate 102, the hub 104, the display 106, and the peripheral devices 108. The cables 110 may include any wire, cable, or other hardware suitable for allowing electrical power and information to be transferred between the power plate 102, the hub 104, the display 106, and the peripheral devices 108. According to exemplary implementations, any device (e.g., the power plate 102, display 106, and/or the peripheral devices 108) may be connected to the hub 104 without identifying or "keying-in" that device. The display 106 may be any device suitable for visually conveying dynamic information to a user of the portable power system assembly 100. Functionalities of the display 106 are described in further detail herein. The peripheral devices 108 can include any device that uses electrical power to operate. In FIG. 1, the peripheral devices 108 include a GPS device 112, a radio 114, a battery charger 116, and an MP3 player 118. It is noteworthy that two or more components of the power plate assembly 100 may be integrated as single device. For example, the power plate 102 and the hub 104 may be integrated as a single device having some or all of the functionalities attributed herein to the power plate 102 and the hub 104.

The power plate 102 may be incorporated in an armored garment (not depicted in FIG. 1). Such an armored garment may include any wearable item that is protective against ballistic projectiles like bullets, shrapnel, and/or other projectiles. Examples of armored garments may include bullet-resistant vests, armored headwear, lower body armor, and so forth. The power plate 102 may be removable or permanently integrated with the armored garment. The power plate 102 may be rigid, semi-rigid, partially flexible, or wholly flexible. The power plate 102 may have a footprint that corresponds to the footprint of an armored plate 120, as shown in FIG. 1. The armored plate 120 may also be incorporated in an armored garment.

The power plate 102 and the armored plate 120 may be positioned proximally and face-to-face when incorporated in an armored garment. By way of non-limiting example, the power plate 102 and the armored plate 120 may be positioned at the anterior abdominal area of a vest such that, when worn by a user, the armored plate 120 is disposed between the power plate 102 and the user. Furthermore, a second power plate similar to the power plate 102 and a second armored plate similar to the armored plate 120 may be positioned to posterior abdominal area of the vest such that, when worn by the user, the second armored plate is disposed between the second power plate and the user. According to exemplary implementations, the power plate 102 and constituent components thereof may be military ruggedized for field use, and may be designed to avoid vibrational susceptibility. Objects having natural frequencies and/or natural frequency harmonics in the range of about 1500-2000 Hz may be susceptible to vibrations, such as during transportation.

The armored plate 120 may provide ballistic protection to a user of an armored garment that incorporates the armored plate 120. When positioned proximally and face-to-face, the power plate 102 may enhance the protectiveness of the armored plate 120. For example, a ballistic projectile that first strikes the power plate 102 may be decelerated, shattered, or deflected to some degree (e.g., twist), thereby reducing energy transmitted to the armored plate 120.

The power plate 102 may include one or more cells such as cells 122 (i.e., cells 122a, 122b, 122c, 122d, 122e, 122f, 122g, 122h, 122i, 122j, 122k, 122l, 122m, 122n, 122p). Although sixteen cells—cells 122a-122p—are depicted in FIG. 1, it should be appreciated that the power plate 102 can include any number of cells. The cells 122 may each include an electrochemical cell for electricity storage. It is noteworthy that the cells 122 may be replaced by other types of electrical storage devices such as capacitive storage devices (not depicted in FIG. 1).

Furthermore, individual ones of the cells 122 may include one or more sensors such as a temperature sensor 124. Examples of temperature sensors include thermocouples, thermistors, silicon bandgap temperature sensors, resistive thermal devices (RTDs), and so forth. The temperature sensor 124 may be communicatively coupled with a processor, which is described further herein.

The cells 120 may be electrically coupled in any number of configurations. As depicted in FIG. 1, cells 122a-122d are connected to form string 126a, cells 122e-122h are connected to form string 126b, cells 122i-122l are connected to form string 126c, and cells 122m-122p are connected to form string 126d. The strings 126 may include any number of cells.

Furthermore, the strings 126 may each include or be associated with one or more overcurrent protection devices (not depicted in FIG. 1). Such overcurrent protection devices may be configured to limit current delivered to one of the cells 122 and/or the strings 126. According to some implementations, for example, each of the cells 122 may be associated with a separate overcurrent protection device that may autonomously limit current delivered to a cell associated therewith. Limitations on current may include cutting off current completely, and may be based on any number of factors including individual cell temperature and individual cell capacity.

Although the strings 126 are depicted in FIG. 1 as being linear arrays of cells, the strings 126 may include any configuration such as a rectangular array of cells. The cells that are respectively included in each of the strings 126 may be connected in series, in parallel, or in another configuration. The strings 126 may be connected in series, in parallel, or in another configuration. Additionally, the strings 126 may be isolated from each other so that they are not interconnected. By segregating the strings 126, performance of the power plate 102 may be maintained, even when one or more of the strings 126 become disabled, such as in the event of ballistic impact on one of the strings 126. Furthermore, wires and/or cables routed to the cells 122 may be segregated so as to minimize wire and/or cable failure in the event of ballistic impact on a wire or cable.

It is noteworthy that the spatial distribution of cells 122 in the power plate 102 may affect a thermal image of the power plate 102 while in use. For example, if the cells 122 are densely packed, a "hot spot" may be present in the thermal image. In contrast, if the cells 122 are sparsely packed, any potential hot spot may be reduced.

The power plate 102 may additionally include one or more processors such as processor 128. The processor 128 is configured to provide information processing capabilities in the power plate 102. The natural frequency of the processor 128 does not have a natural frequency below 2000 Hz when mounted to the power plate 102. As such, the processor 128 may include one or more of a digital processor, an analog processor, a digital circuit designed to process information, an analog circuit designed to process information, a state machine, and/or other mechanisms for electronically processing information. Although the processor 128 is shown in FIG. 1 as a single entity, this is for illustrative purposes only. In some implementations, the processor 128 may include a plurality of processing units. These processing units may be physically located within the same device, or the processor 128 may represent processing functionality of a plurality of devices operating in coordination.

The processor 128 may be configured to execute one or more computer program modules. The one or more computer program modules may include one or more of a temperature module 130, a charge level module 132, a status module 134, a cell disconnect module 136, a charge balancing module 138, a discharge balancing module 140, a status display module 142, and/or other modules. The processor 128 may be configured to execute modules 130, 132, 134, 136, 138, 140, and/or 142 by software; hardware; firmware; some combination of software, hardware, and/or firmware; and/or other mechanisms for configuring processing capabilities on the processor 128.

It should be appreciated that although modules 130, 132, 134, 136, 138, 140, and 142 are illustrated in FIG. 1 as being co-located within a single processing unit, in implementations in which the processor 128 includes multiple processing units, one or more of the modules 130, 132, 134, 136, 138, 140, and/or 142 may be located remotely from the other modules. The description of the functionality provided by the different modules 130, 132, 134, 136, 138, 140, and/or 142 described below is for illustrative purposes, and is not intended to be limiting, as any of modules 130, 132, 134, 136, 138, 140, and/or 142 may provide more or less functionality than is described. For example, one or more of modules 130, 132, 134, 136, 138, 140, and/or 142 may be eliminated, and some or all of its functionality may be provided by other ones of modules 130, 132, 134, 136, 138, 140, and/or 142. As another example, processor 128 may be configured to execute one or more additional modules that may perform some or all of the functionality attributed below to one of modules 130, 132, 134, 136, 138, 140, and/or 142.

The temperature module 130 may be configured to monitor a temperature of one or more of the cells 122. This monitoring may be performed in conjunction with one or more temperature sensors such as the temperature sensor 124. According to some implementations, the temperature of each of the cells 122 (or a subset thereof) may be individually monitored. Alternatively, the temperatures of the cells 122 may be monitored as an aggregate temperature on a group basis. For example, the average temperature of cells 122e-122h may be monitored as an aggregate temperature associated with string 126b.

The charge level module 132 may be configured to determine a charge level of one or more of the cells 122. Charge level of a cell, for example, describes the amount of electrical power contained in or stored by that cell. The charge level of each of the cells 122 (or a subset thereof) may be individually determined, in accordance with some implementations. The charge levels of the cells 122 may also be determined as an aggregate charge level on a group basis. To illustrate, the aggregate charge level of each of the strings 126 may be determined.

The status module 134 may be configured to provide status information associated with one or more of the cells 122. Status information may be any information associated with one or more of the cells 122. For example, the status information may be based at least in part on the temperature and/or the charge level of one or more of the cells 122. The status module 134 may also be executed to determine a fault associated with at least one of the cells 122. Such a fault may be based on any failure mode or other state of inoperability of one or more of the cells 122. Additionally, a fault may be based at least in part, for example, on the temperature and/or the charge level being outside of a predetermined range. The status information may be provided to other components of the portable power system assembly 100 such as the hub 104, the display 106, and the peripheral devices 108 via the cables 110.

The cell disconnect module 136 may be configured to disconnect one or more of the cells 122 having a fault associated therewith, such as that determined through execution of the status module 134. By disconnecting a cell having a fault, performance of the portable power system assembly 100 may be enhanced. For example, catastrophic failure of a cell such as an explosion or cell ignition may be prevented. Furthermore, leakage of damaged cells may be halted or minimized. Additionally, by disconnecting a cell having a fault, the remaining cells may be prevented from becoming faulty or otherwise damaged.

The charge balancing module 138 may be configured to control a charge power level delivered to each of the cells 122, such as while the cells 122 are being charged. Alternatively or additionally, the charge balancing module 138 may be configured to control a charge power level delivered to at least one group of the cells 122, such to the string 126a. Generally, the charge balancing module 138 may balance the charge power levels delivered to the cells 122 by evenly charging the cells 122 to maintain even capacities and temperatures among the cells 122 (e.g., within threshold bands). To control the charge power level, voltage and/or current may be regulated. The charge power level may be controlled based on a number of factors such as cell capacity, cell resistance, cell temperature, and/or any other factors.

Controlling the charge power level during charging of the cells 122 may extend lifetime and maintain proper performance of the cells 122, as well as prevent overheating. Controlling charge power level of each cell may minimize or greatly reduce charging times. For example, controlling the charge power level may prevent against overcharging where a cell's capacity is exceeded, overvoltage where the cell voltage exceeds an upper design limit, and/or overcurrent where the current delivered to the cell exceeds an upper design limit. To illustrate controlling a charge power level, if one cell is at 80% capacity and the remaining cells are each at 98% capacity, the charge balancing module 138 will prevent excessive current from being provided to the one cell during charging while the capacity of the one cell is brought up to match that of the remaining cells.

The discharge balancing module 140 may be configured to control a discharge power level drawn from each of the cells 122, such as when electrical power is being provided to the peripheral devices 108. Alternatively or additionally, the discharge balancing module 140 may be configured to control a discharge power level drawn from at least one group of the cells 122, such from the string 126a. Generally, the discharge balancing module 140 may balance the discharge power levels drawn from the cells 122 by evenly discharging the cells 122 to maintain even capacities and temperatures among the cells 122. To control the discharge power level, voltage and/or current may be regulated. The discharge power level may be controlled based on a number of factors such as cell capacity, cell resistance, cell temperature, and/or any other factors.

Controlling the discharge power level during charging of the cells 122 may extend lifetime and maintain proper performance of the cells 122, as well as prevent safety risks. For example, controlling the discharge power level may prevent against deep discharging where a cell is completely drained or rapid discharges due to shorted circuitry. To illustrate controlling a discharge power level, if the power plate 102 is utilized to provide electrical power to a lamp that is left on for an extended period of time, the discharge balancing module 140 may prevent the cells 122 from becoming completely drained.

The status display module 142 may be configured to provide status information to a user of the portable power system assembly 100, such as via the display 106. Status information may be provided to the status display module 142 through execution of the status module 134. Status information may include information such as individual cell capacities, aggregate cell capacities, total cell capacity, individual cell temperatures, aggregate cell temperatures, and/or any other information associated with the cells 122. Faults associated with one or more of the cells 122 may also be conveyed to a user though execution of the status display module 142. Additional data may be provided to a user through execution of the status display module 142, such as via the display 106. For example, the number of and identity of the peripheral devices 108 connected to the hub 104 may be indicated on the display 106.

FIG. 2A illustrates an exemplary implementation of a portable power system assembly 200A. The portable power system assembly 200A may include a power plate 202, a power plate 204, a hub 206 and a display 208. Aspects of the power plate 202 and the power plate 204 may be similar to the power plate 102 depicted in FIG. 1. Additionally, aspects of the hub 206 and the display 208 may be similar, respectively, to the hub 104 and the display 106 depicted in FIG. 1. The power plates 202 and 204 may be detachably connected to the hub 206 by cables 210 and 212, respectively, while the display 208 may be detachably connected to the hub 206 by cable 214. Detachable connections may be achieved by connectors coupled to ends of the cables 210, 212, and 214 used in conjunction with ports incorporated in various components of the portable power system assembly 200A such as the hub 206. The cables 210, 212, and 214 may facilitate transference of electrical power and information, and be similar to the cables 110 depicted in FIG. 1.

Figure 2B:
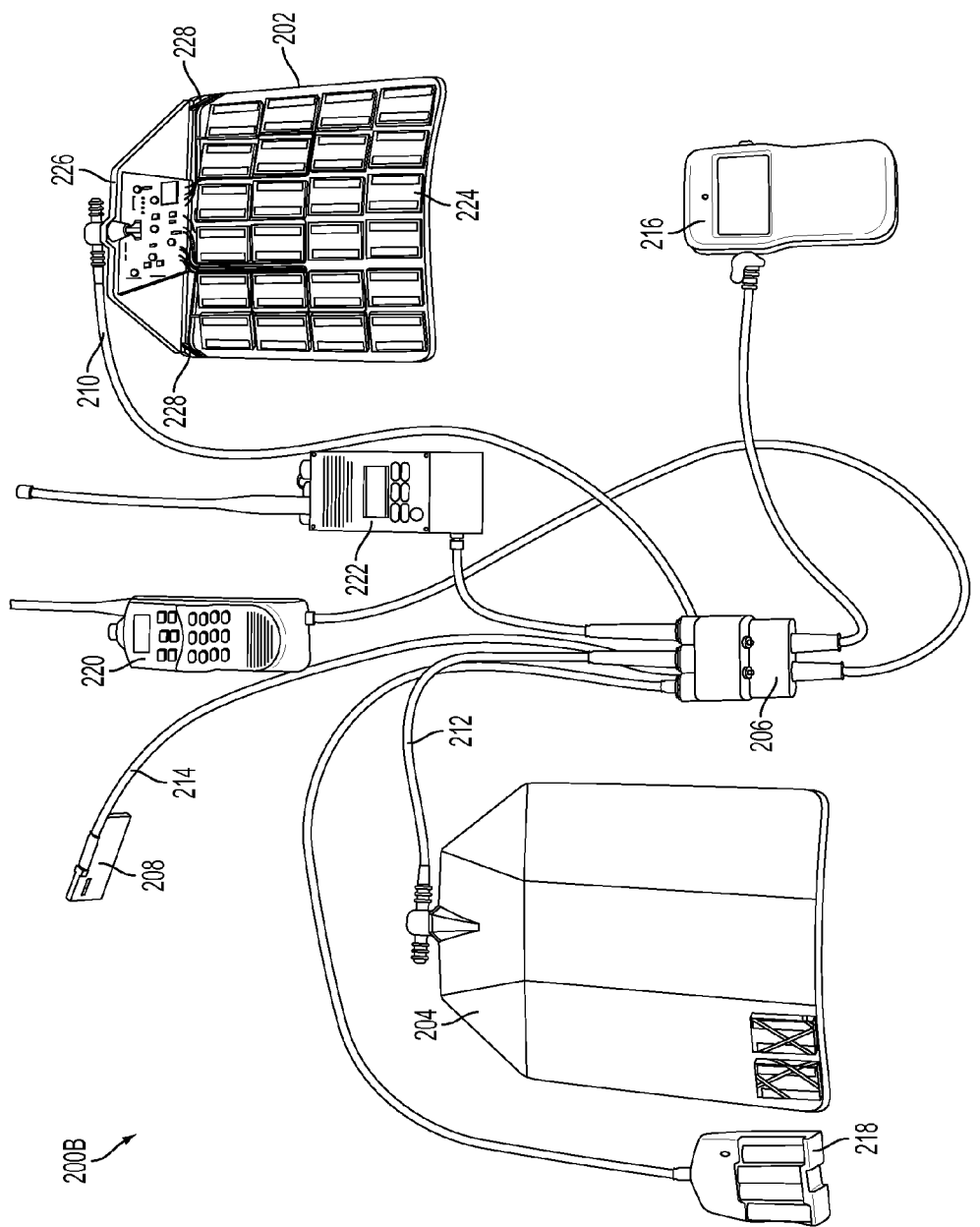
FIG. 2B illustrates the portable power system assembly of FIG. 2A with certain peripheral devices.

FIG. 2B illustrates an exemplary implementation of a portable power system assembly 200B including certain peripheral devices. More specifically, the portable power system assembly 200B may include a GPS device 216, a battery charger 218, a land radio 220, and a multi-band radio 222. The portable power system assembly 200B may also include the power plate 202, the power plate 204, the hub 206, the display 208, and the cables 210, 212, and 214, similarly as in portable power system assembly 200A. The GPS device 216, the battery charger 218, the land radio 220, and the multi-band radio 222 may be detachably connected to the hub 206 by various cables. The power plate 202 and the power plate 204 may provide electrical power to the GPS device 216, the battery charger 218, the land radio 220, and the multi-band radio 222 via the hub 206.

The power plate 202 and the power plate 204 may be substantially similar. For illustrative purposes, however, constituent components of the power plate 202 may be visible in FIGS. 2A and 2B. More specifically, the power plate 202 may include an array of cells 224, an electronics unit 226, and check valves 228.

The array of cells 224 may include six rows and four columns of cells. The cell included in the array of cells 224 may be grouped electrically as a number of strings. For example, the cells in each column in the array of cells 224 may be electrically coupled together as individual strings. Each string may be physically isolated from other strings so that, in the event of a catastrophic failure of one string, the other strings may be prevented from damage. For example, if one string is impacted by a ballistic projectile causing one or more cells in that string to rupture and ignite, resultant gases or heat may be substantially isolated from the other strings, which may remain operable.

The electronics unit 226 may include electronic components suitable for transferring electrical power between the power plate 202 to other components of the portable power system assembly 200A and/or the portable power system assembly 200B. The electronics unit 226 may also facilitate the transfer of information associated with the array of cells 224 to other components of the portable power system assembly 200A and/or the portable power system assembly 200B. According to some implementations, the electronics unit 226 may include one or more processors such as the processor 128.

The check valves 228 may provide controlled pressure release in the event of a catastrophic failure of one or more cells included in a string. For example, if one string is impacted by a ballistic projectile causing one or more cells in that string to rupture and/or ignite, pressure from resultant gases may be released by one or more of the check valves 228. After pressure is released, the check valves 228 may reseal to maintain physical isolation of the strings of cells. By the check valves 228 resealing, the cells 122 may maintain compatibility with adverse environmental conditions such as marine conditions.

Figure 3A:
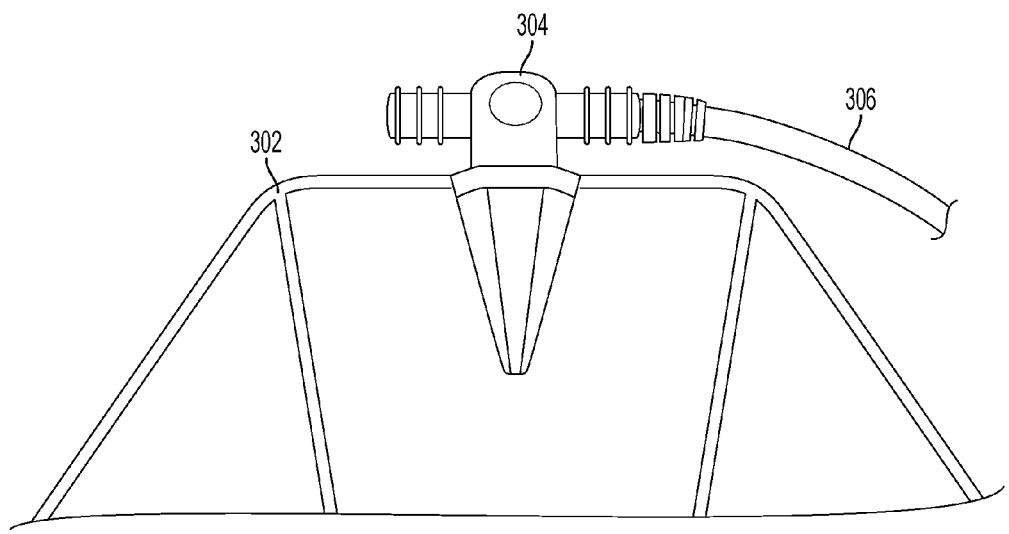
FIG. 3A illustrates a power plate connected to a cable connector, according to an exemplary implementation.
Figure 3B:
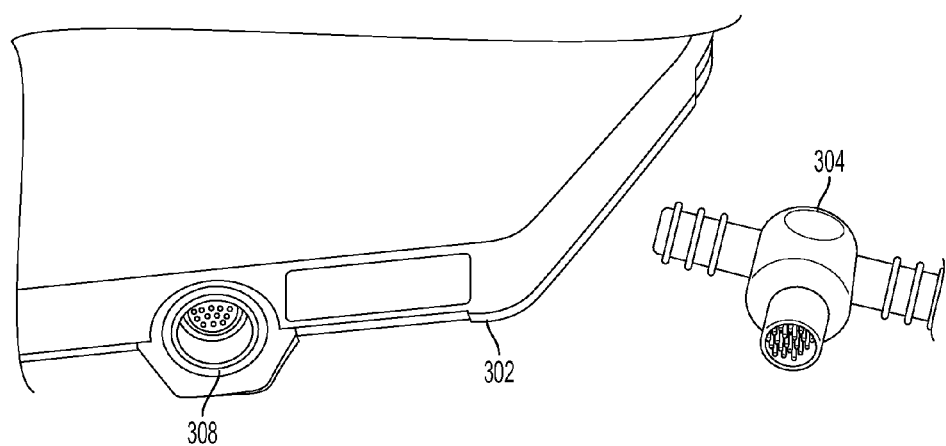
FIG. 3B illustrates the power plate and the cable connector of FIG. 3A disconnected from each other.

FIG. 3A illustrates a power plate 302 connected to a cable connector 304, according to an exemplary implementation. Aspects of the power plate 302 may be similar to the power plate 102 depicted in FIG. 1. The cable connector 304 may be utilized to detachably connect cable 306 to the power plate 302. The cable 306 may facilitate transfer of electrical power and information between the power plate 302 and other components of a portable power system assembly such as portable power system assembly 200B. FIG. 3B illustrates the power plate 302 disconnected from the cable connector 304. A port 308 integral with the power plate 302 may receive the cable connector 304. The cable connector 304 and/or the port 308 may include a number of pins for electrical power and information transfer.

Figure 4A:
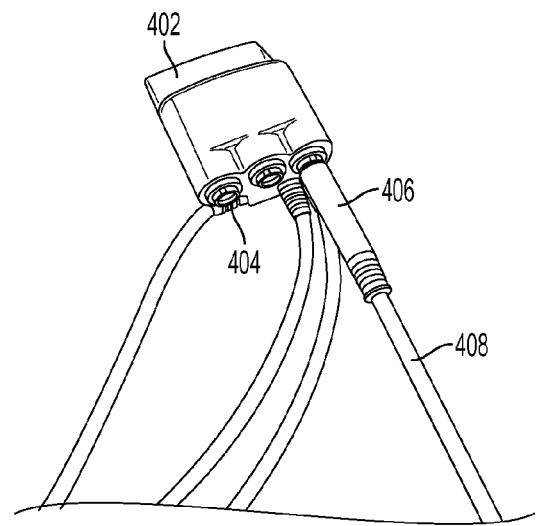
FIG. 4A illustrates an exemplary implementation of a hub.

FIG. 4A illustrates a hub 402 according to an exemplary implementation. Aspects of the hub 402 may be similar to the hub 104 depicted in FIG. 1. The hub 402 may include a number of ports such as port 404. The port 404 may receive a cable connector such as cable connector 406 in order to detachably connect a cable such as cable 408 to the hub. The hub 402 may form an electrical and informational interface between one or more power plates (e.g., the power plate 102 depicted in FIG. 1) and one or more peripheral devices (e.g., the peripheral devices 108 depicted in FIG. 1), such that electrical power and information may flow between the one or more power plates and the one or more peripheral devices.

Figure 4B:
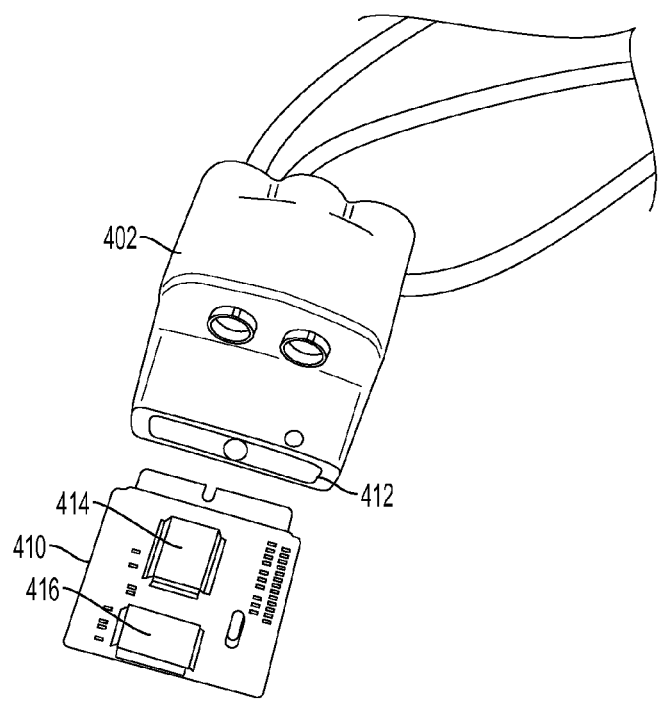
FIG. 4B illustrates the hub of FIG. 4A with a controller card removed.

FIG. 4B illustrates the hub 402 with a controller card 410 removed. The controller card 410 may be inserted and ejected from card slot 412. The controller card 410 may be replaced, for example, to facilitate hardware upgrades and/or repairs. The controller card may include one or more processors such as processors 414 and 416.

The processors 414 and 416 are configured to provide information processing capabilities in the hub 402. As such, each of the processors 414 and 416 may include one or more of a digital processor, an analog processor, a digital circuit designed to process information, an analog circuit designed to process information, a state machine, and/or other mechanisms for electronically processing information. Although the processors 414 and 416 are shown in FIG. 4B as two individual entities, this is for illustrative purposes only. In some implementations, each of the processors 414 and 416 may include a plurality of processing units. These processing units may be physically located within the same device, or each of the processors 414 and 416 may represent processing functionality of a plurality of devices operating in coordination. The processors 414 and 416 may each be configured to execute one or more computer program modules. For example, one or both of the processors 414 and 416 may execute a computer program module to identify peripheral devices and power plates that are connected to the hub 402

Figure 5:
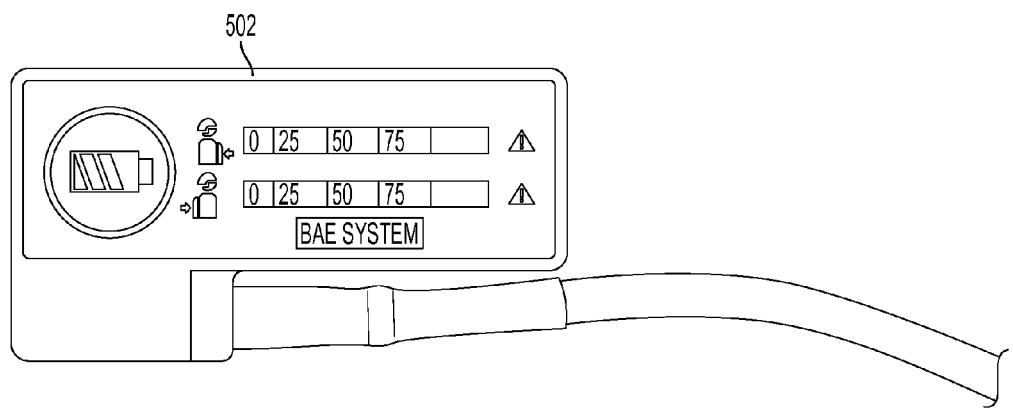
FIG. 5 illustrates an exemplary implementation of a display.

FIG. 5 illustrates an exemplary implementation of a display 502. Aspects of the display 502 may be similar to the display 106 depicted in FIG. 1. The display 502 may visually convey information to a user such as status information associated with one or more power plates (e.g., the power plate 102 depicted in FIG. 1). The display 502 may be dual sided. That is, the display 502 may be capable of visually conveying dynamic information to a user from both sides (front and back) of the display 502. Being dual sided may allow for ambidextrous placement of the display 502.

Figure 6:
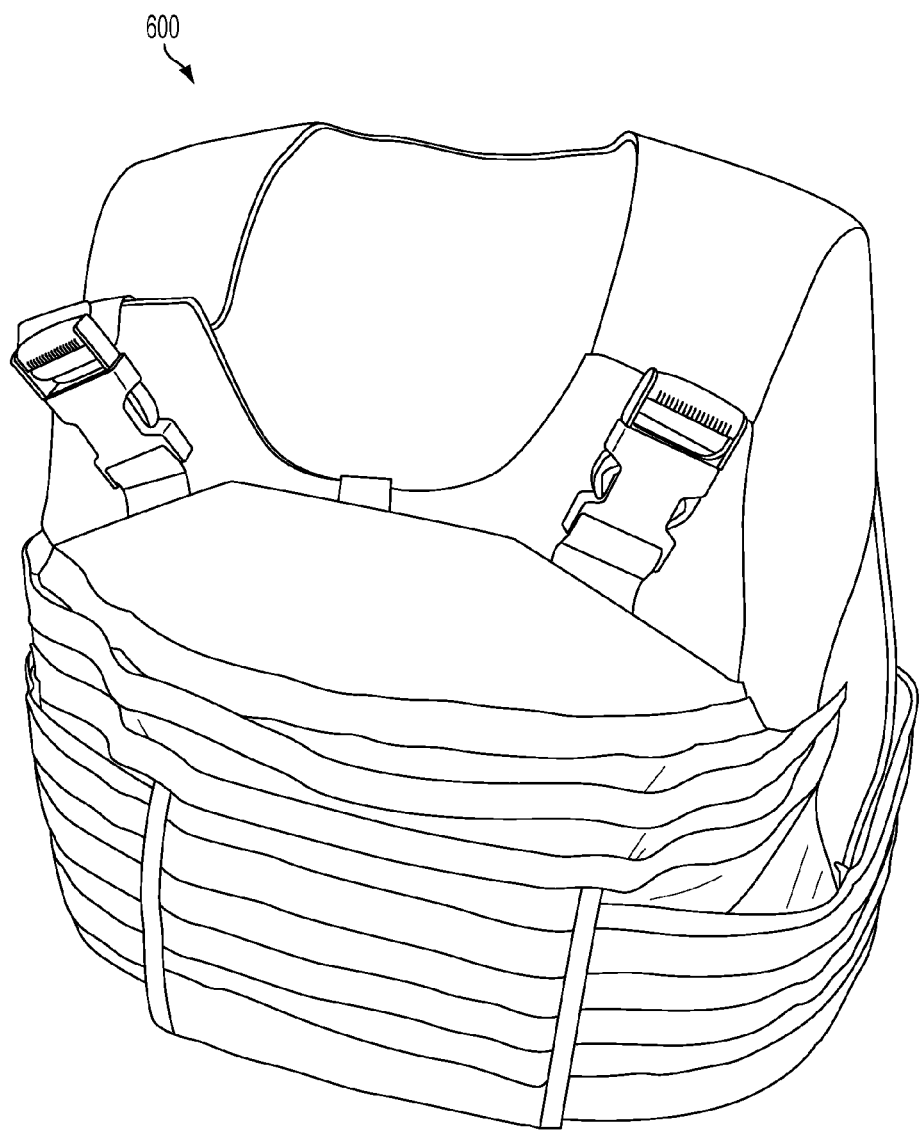
FIG. 6 illustrates an exemplary implementation of an armored vest, with which power plates can be incorporated.

FIG. 6 illustrates an exemplary implementation of an armored vest 600, with which power plates (e.g., the power plate 102 depicted in FIG. 1) may be incorporated. The armored vest 600 may also incorporate one or more armored plates such as the armored plate 120 depicted in FIG. 1. A power plate and/or an armored plate may be positioned in the anterior abdominal area of the armored vest 600. Similarly, a power plate and/or an armored plate may be positioned in the posterior abdominal area of the armored vest 600. The armored vest 600 may be worn, for example, by military and/or law enforcement personnel to project against ballistic projectiles, shrapnel, and/or other projectiles. The armored vest 600 is described in further detail in connection with FIGS. 7A, 7B, 8, and 9.

Figure 7A:
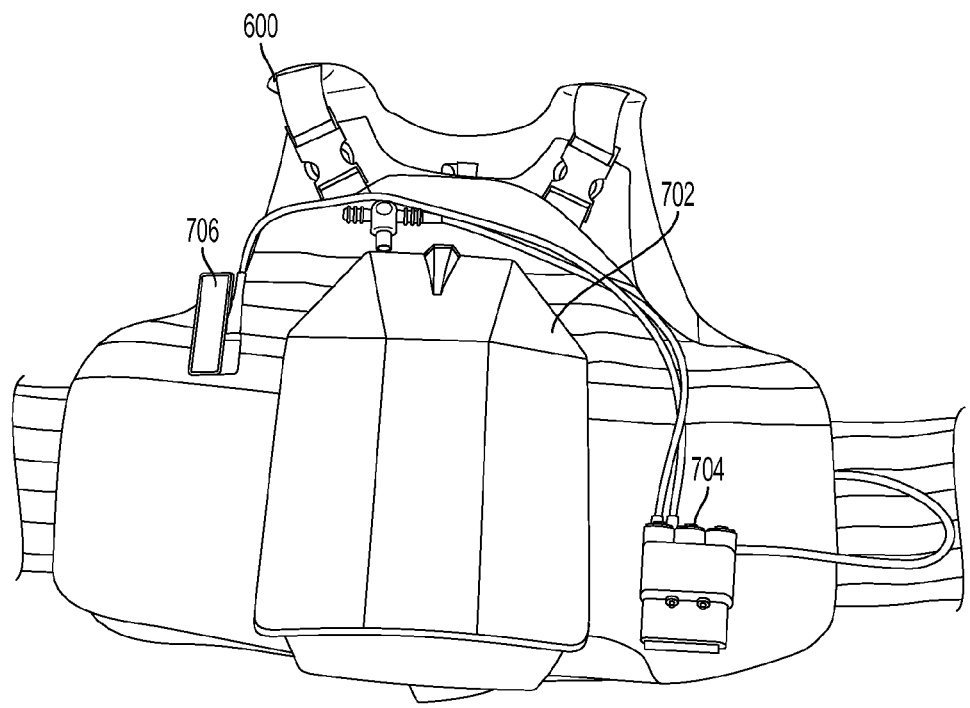
FIGS. 7A and 7B respectively illustrate right-handed and left-handed layout positions of a power plate, a hub, and a display in relation to the armored vest of FIG. 6.
Figure 7B:
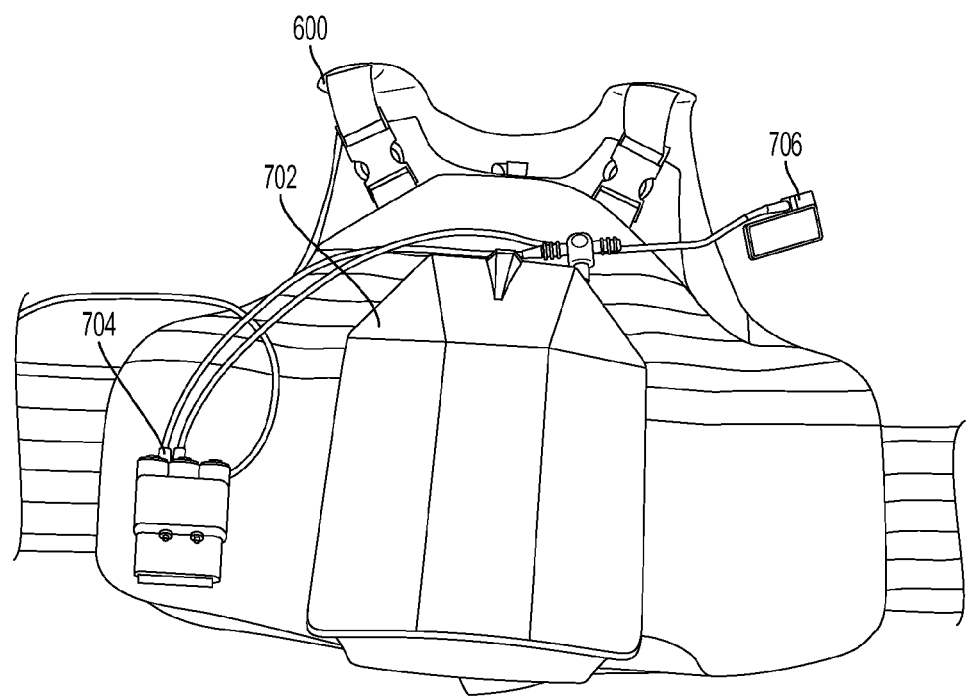

FIGS. 7A and 7B respectively illustrate right-handed and left-handed layout positions of a power plate 702, a hub 704, and a display 706 in relation to the armored vest 600. More specifically, the power plate 702, the hub 704, and the display 706 are overlaid on the armored vest 600 to describe exemplary positions of the power plate 702, the hub 704, and the display 706 when incorporated with the armored vest 600. The layout positions illustrated in FIGS. 7A and 7B are illustrative of exemplary positions of the power plate 702, the hub 704, and the display 706, and do not encompass all possible positions. Aspects of the power plate 702, the hub 704, and the display 706 may be similar, respectively, to the power plate 102, the hub 104, and the display 106 depicted in FIG. 1.

In both FIG. 7A and FIG. 7B, the power plate 702 is positioned at the anterior abdominal area of the armored vest 600. The power plate 702 may be aligned with an armored plate when incorporated with the armored vest 600, such that the power plate 702 and the armored plate are positioned proximally and face-to-face. In FIG. 7A, the hub 704 is positioned at the left-lateral waist area of the armored vest 600, whereas in FIG. 7B, the hub 704 is positioned at the right-lateral waist area of the armored vest 600. The display 706, in FIG. 7A, is positioned at the right-chest area of the armored vest 600. In FIG. 7B, the display, 706 is positioned at the left-chest area of the armored vest 600. The ambidextrous nature of the layout positions illustrated in FIGS. 7A and 7B demonstrate convenient positioned for both right-handed and left-handed users.

Figure 8:
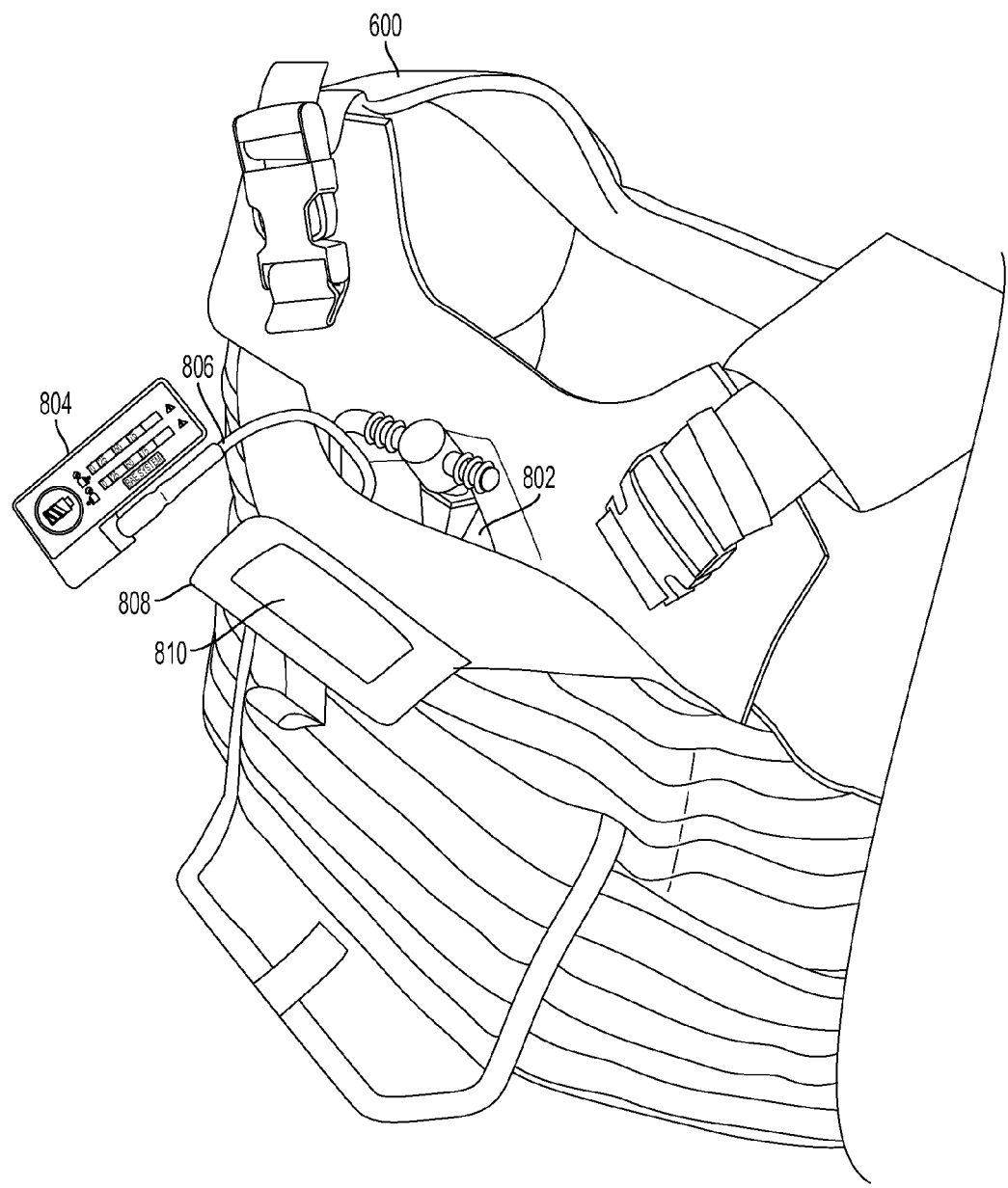
FIG. 8 illustrates the armored vest of FIG. 6 having a power plate and a display incorporated therewith.

FIG. 8 illustrates the armored vest 600 having a power plate 802 and a display 804 incorporated therewith. Aspects of the power plate 802 and the display 804 may be similar, respectively, to the power plate 102 and the display 106 depicted in FIG. 1. The power plate 802 may be incorporated with the armored vest 600 in that the power plate 802 may be held within a sleeve integral with the armored vest 600. Various sleeves of the armored vest 600 are described further in connection with FIG. 9. The display 804 may be connected to the power plate 802 via the cable 806 and, for example, a hub (not depicted in FIG. 8) such as the hub 104 of FIG. 1. The sleeve 808 may secure the display 804 while the 600 is worn by a user. The sleeve 808 may include a window 810 to allow information to be visually conveyed from the display 804 to the user while the display 804 is inserted in the sleeve 808.

Figure 9:
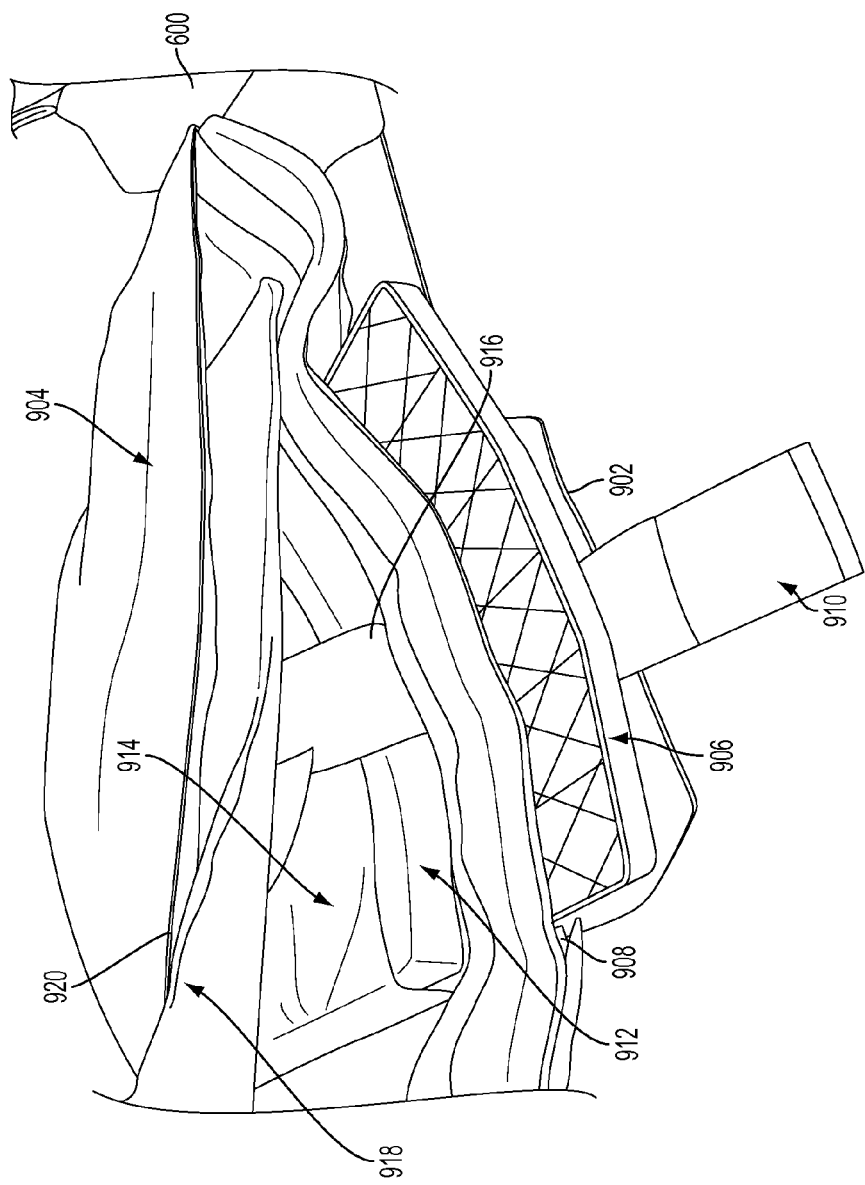
FIG. 9 illustrates a detailed view of the armored vest of FIG. 6.

FIG. 9 illustrates a detailed view of the armored vest 600. More specifically, FIG. 9 shows the bottom edge of the anterior portion of the armored vest 600. According to exemplary implementations, the posterior portion (not depicted in FIG. 9) of the armored vest 600 may be substantially similar, in design and/or functionality, to anterior portion of the armored vest 600. In FIG. 9, the armored vest 600 may be oriented such that the front-side 902 is at the bottom and the back-side 904 is at the top. When the armored vest 600 is worn a user, the back-side 904 may be closest to the user.

A power plate 906 is shown inserted into power plate sleeve 908. The power plate 906 may be secured in the power plate sleeve 908 using a power plate extraction strap 910, which may include Velcro and/or other fasteners. Alternatively or additionally, the power plate 906 may be secured in the power plate sleeve 908 using a pouch (not depicted in FIG. 9) that suspends the power plate 906 in the power plate sleeve 908. An armored plate 912 is shown inserted into armored plate sleeve 914. The armored plate 912 may be secured in the armored plate sleeve 914 using a armored plate extraction strap 916. Alternatively or additionally, the armored plate 912 may be secured in the armored plate sleeve 914 using a pouch (not depicted in FIG. 9) that suspends the armored plate 912 in the armored plate sleeve 914. Aspects of the power plate 906 and the armored plate sleeve 914 may be similar, respectively to the power plate 102 and the armored plate 120 of FIG. 1. Additionally, a soft armor layer 918 is shown inserted into a soft armor layer sleeve 920. The soft armor layer 918 may provide increased ballistic protection to a user while the armored vest 600 is worn.

As such, the power plate 906, the armored plate 912, and/or the soft armor layer 918 may be removed and/or replaced through the bottom of the armored vest 600. Removal of the power plate 906, the armored plate 912, and/or the soft armor layer 918 through the bottom of the armored vest 600 may be advantageous, relative to removal through the top of the vest, for example, when a user is in a prone position where the user's chin might otherwise hamper removal.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. Apparatus configured to provide electrical power while incorporated in an armored garment, the apparatus comprising: a power plate having a footprint that corresponds to a plate of body armor; a plurality of energy storage cells carried by the power plate; a port carried by the power plate, the port being configured to output power stored in the plurality of energy storage cells from the apparatus; one or more processors configured to execute computer program modules, the computer program modules comprising: a temperature module configured to monitor temperature of the energy storage cells such that temperature is monitored separately for separate thermal sets of one or more of the energy storage cells; a charge level module configured to determine charge level separately for separate charge sets of one or more the energy storage cells; and a status module configured to determine status information associated with individual ones of energy storage cells, wherein the status module is configured such that the status information for a given energy storage cell is determined based on (i) the temperature of the thermal set of energy storage cells corresponding to the given energy storage cell and (ii) the charge level of the charge set of energy storage cells corresponding to the given energy storage cell.

2. The apparatus of claim 1, wherein the thermal sets of energy storage cells are single, individual energy storage cells.

3. The apparatus of claim 1, wherein the charge sets of energy storage cells are single, individual energy storage cells.

4. The apparatus of claim 1, wherein the division of the energy storage cells into the thermal sets of energy storage cells is substantially identical to the division of the energy storage cells into the charge sets of energy storage cells.

5. The apparatus of claim 1, wherein the status module is further configured to provide determined status information to one or more devices to which electrical power is provided from the energy storage cells.

6. The apparatus of claim 1, wherein the status information includes an indication of a fault/no-fault status.

7. The apparatus of claim 6, wherein the computer program modules further comprise a cell disconnect module configured to disconnect energy storage cells such that power from a disconnected energy storage cell is no longer provided to the port, wherein the cell disconnect module is configured to disconnect energy storage cells responsive indications of the fault/no-fault status in the status information.

8. The apparatus of claim 1, wherein the computer program modules further comprise a charge balancing module configured to control charge power level delivered to the charge groups of energy storage cells separately while the energy storage cells are being charged.

9. The apparatus of claim 8, wherein the charge power level delivered to a given charge group of energy storage cells is controlled based on one or more of capacity, resistance, or temperature of the given charge group of energy storage cells.

10. The apparatus of claim 1, wherein the computer program modules further comprise a discharge balancing module configured to separately control discharge power level drawn from the charge groups of energy storage cells while the energy storage cells are being discharged.

11. The apparatus of claim 10, wherein the discharge power level discharged from a given charge group of energy storage cells is controlled based on one or more of capacity, resistance, or temperature of the given charge group of energy storage cells.

12. The apparatus of claim 1, wherein the computer program modules further comprise a status display module configured to provide the status information to a user via a display device.

* * * * *